United States Patent Office 3,557,287
Patented Jan. 19, 1971

3,557,287
COMPOSITIONS AND METHODS FOR TREATING HEADACHES OF VASCULAR ORIGIN WITH COMBINATIONS OF CAFFEINE, A VASOTONIC LYSERGIC ACID AND A THIOXANTHENE
Botond Berde and Albert Fanchamps, Basel, Switzerland, assignors to Sandoz Ltd. (also known as Sandoz AG), Basel, Switzerland
No Drawing. Filed Dec. 31, 1968, Ser. No. 788,351
Claims priority, application Switzerland, Jan. 9, 1968, 350/68
Int. Cl. A61k 27/00
U.S. Cl. 424—253
6 Claims

ABSTRACT OF THE DISCLOSURE

The invention relates to a pharmaceutical composition incorporating as active constituents:

(a) a vasotonic lysergic acid derivative of the peptide type or a pharmaceutically acceptable acid addition salt thereof;
(b) caffeine; and
(c) 9-(1-methyl - 4 - piperidylidene)thioxanthene or a pharmaceutically acceptable acid addition salt thereof.

The composition is useful for treating attacks of migraine, or migraine equivalents, and vascular headaches.

---

The present invention relates to a pharmaceutical composition incorporating as active constituents:

(a) a vasotonic lysergic acid derivative of the peptide type or a pharmaceutically acceptable acid addition salt thereof;
(b) caffeine; and
(c) 9-(1-methyl - 4 - piperidylidene)thioanthene or a pharmaceutically acceptable acid addition salt thereof;
the preparation of the constituents (a): (b): (c) being by weight, from about 1:5:0.05 to about 1:2000:20.

The vasotonic lysergic acid derivative of the peptide type, which may be employed in the composition, may be ergostine, ergotamine, dihydroergostine, dihydroergotamine, ergovaline, 5' - methyl-ergolanine, or a pharmaceutically acceptable acid addition salt thereof. For example, ergostine may be employed as its hydrogen maleate, ergotamine as its tartrate, dihydroergostine as its hydrogen maleate or tartrate, dihydroergotamine as its tartrate or methanesulphonate, ergovaline as its sulphate and 5'-methyl-ergolanine as its methanesulphonate.

The name "mepithiathene" is hereinafter used for 9-(1 - methyl-4-piperidylidene)thioxanthene. Mepithiathene may also be used in the form of a pharmaceutically acceptable acid addition salt, for example as its hydrogen maleate.

The ratio, by weight, of constituents (a): (b): (c) is preferably from about 0.5:30:1 to about 3:300:1.

The pharmaceutical composition, in unit dose form, may incorporate from about 0.5 mg. to about 3 mg. of constituent (a), from about 50 mg. to about 300 mg. of constituent (b), and from about 0.3 mg. to about 3 mg. of constituent (c). For example, the composition may have the following constitutions:

|  | A | B | C | D | E | F |
|---|---|---|---|---|---|---|
| Ergostine hydrogen maleate, mg | 1.2 | 2.4 |  |  |  |  |
| Ergotamine tartrate, mg |  |  | 1 | 1 | 2 | 2 |
| Caffeine, mg | 100 | 100 | 100 | 100 | 100 | 100 |
| Mepithiathene hydrogen maleate, mg | 0.7 | 1.4 | 0.7 | 1.4 | 2.8 | 1.4 |

The invention also extends to galenic preparations of the composition, which are suitable for enteral or parenteral administration, e.g. tablets, dragées, capsules, suppositories and injectable solutions. In order to produce such medicinal preparations the mixture of active constituents is worked up with the usual organic or inorganic, pharmacologically inert adjuvants. Examples of such adjuvants are lactose, starch, polyvinyl pyrrolidone, stearic acid, sorbic acid, talc, methyl cellulose, alcohols, glycerin and natural or hardened oils. The preparations may furthermore contain suitable sweetening or colouring substances and flavourings.

EXAMPLES OF GALENIC PREPARATIONS

Example 1.—Capsules (composition A)

| | G. |
|---|---|
| Ergostine hydrogen maleate | [1] 0.0012 |
| Caffeine (anhydrous) | 0.10 |
| Mepithiathene hydrogen maleate | [2] 0.0007 |
| Talc | 0.050 |
| Lactose | 0.1381 |
| Content of the capsule | 0.290 |
| Cover about | 0.080 |
| For a capsule of about | 0.370 |

[1] Corresponds to 0.0010 g. of base.
[2] Corresponds to 0.0005 g. of base.

Ergostine hydrogen maleate, caffeine and mepithiathene hydrogen maleate are mixed with talc and lactose; the mixture is mechanically filled into hard gelatine capsules.

Example 2.—Suppositories (composition B)

| | G. |
|---|---|
| Ergostine hydrogen maleate | [1] 0.0024 |
| Caffeine (anhydrous) | 0.10 |
| Mepithiathene hydrogen maleate | [2] 0.0014 |
| Zinc sulphate | 0.0001 |
| Colour pigment indigo carmine | 0.0003 |
| Colour pigment yellow orange S | 0.0020 |
| Maleic acid | 0.0020 |
| Lactose | 0.0918 |
| Solid fat | 1.74 |
| | 1.94 |

[1] Corresponds to 0.0020 g. of base.
[2] Corresponds to 0.0010 g. of base.

Ergostine hydrogen maleate, caffeine, mepithiathene hydrogen maleate, colour pigments, zinc sulphate, maleic acid and lactose are mixed homogeneously. The mixture is homogeneously suspended in the melted solid fat; the resulting suspension is worked up into suppositories in accordance with the known molding process.

Example 3.—Capsules (composition C)

| | G. |
|---|---|
| Ergotamine tartrate | [1] 0.0010 |
| Caffeine (anhydrous) | 0.10 |
| Mepithiathene hydrogen maleate | [2] 0.0007 |
| Dimethylsilicone oil | 0.00045 |
| Polyethylene glycol 6000 | 0.00135 |
| Magnesium stearate | 0.0020 |
| Polyvinyl pyrrolidone | 0.0045 |
| Maize starch | 0.0090 |
| Talc | 0.0108 |
| Lactose | 0.1602 |
| Content of the capsule | 0.290 |
| Cover about | 0.060 |
| For a capsule of about | 0.350 |

[1] Corresponds to 0.00089 g. of base.
[2] Corresponds to 0.0005 g. of base.

Ergotamine tartrate, caffeine and mepithiathene hydrogen maleate are mixed with part of the talc and with magnesium stearate (I). The remainder of the talc is mixed with polyvinyl pyrrolidone, maize starch and lactose. This mixture is moistened and kneaded with an aqueous suspension of dimethyl silicone oil and polyethylene glycol 6000 until the mass can be granulated. The granulate is dried and crushed (II).

I and II are mixed and mechanically filled into hard gelatin capsules.

|  | G. |
|---|---|
| Ergotamine tartrate | [1] 0.0010 |
| Caffeine (anhydrous) | 0.10 |
| Mepithiathene hydrogen maleate | [2] 0.0014 |
| Dimethylsilicone oil | 0.00045 |
| Polyethylene glycol 6000 | 0.00135 |
| Magnesium stearate | 0.0020 |
| Polyvinyl pyrrolidone | 0.0045 |
| Maize starch | 0.0090 |
| Talc | 0.0101 |
| Lactose | 0.1602 |
| Content of the capsule | 0.290 |
| Cover about | 0.060 |
| For a capsule of about | 0.350 |

[1] Corresponds to 0.00089 g. of base.
[2] Corresponds to 0.0010 g. of base.

Ergotamine tartrate, caffeine and mepithiathene hydrogen maleate are mixed with part of the talc and with magnesium stearate (I). The remainder of the talc is mixed with polyvinyl pyrrolidone, maize starch and lactose. This mixture is moistened and kneaded with an aqueous suspension of dimethylsilicone oil and polyethylene glycol 6000 until the mass can be granulated. The granulate is dried and crushed (II).

I and II are mxied and mechanically filled into hard gelatine capsules.

Example 5.—Suppositories (composition E)

|  | G. |
|---|---|
| Ergotamine tartrate | [1] 0.0020 |
| Caffeine | 0.10 |
| Mepithiathene hydrogen maleate | [2] 0.0028 |
| Colour pigment indigo carmine | 0.0003 |
| Colour pigment yellow orange S | 0.0020 |
| Lactose | 0.10 |
| Solid fat | 1.7429 |
| For a suppository of | 1.95 |

[1] Corresponds to 0.0018 g. of base.
[2] Corresponds to 0.0020 g. of base.

Ergotamine tartrate, caffeine, mepithiathene hydrogen maleate, colour pigments and lactose are homogeneously mixed. This mixture is homogeneously suspended in melted solid fat. The resulting suspension is worked up into suppositories in accordance with the usual molding process.

Example 6.—Suppositories (composition F)

|  | G. |
|---|---|
| Ergotamine tartrate | [1] 0.0020 |
| Caffeine | 0.10 |
| Mepithiathene hydrogen maleate | [2] 0.0014 |
| Colour pigment indigo carmine | 0.0003 |
| Colour pigment yellow orange S | 0.0010 |
| Lactose | 0.10 |
| Solid fat | 1.7453 |
| For a suppository of | 1.95 |

[1] Corresponds to 0.0018 g. of base.
[2] Corresponds to 0.0010 g. of base.

Ergotamine tartrate, caffeine, mepithiathene hydrogen maleate, colour pigments and lactose are homogeneously mixed. This mixture is homogeneously suspended in melted solid fat. The resulting suspension is worked up into suppositories in accordance with the usual molding process.

The toxicity of the new composition is very low. Thus, for example, the $DL_{50}$ values ascertained in mice, rats and rabbits upon peroral administration of mixtures of ergostine, caffeine and mepithiathene are in the same order of magnitude as those ascertained for caffeine under the same conditions (animal species, mode of administration):

|  | $DL_{50}$ in mg./kg. p.o. | | |
|---|---|---|---|
|  | Mice | Rats | Rabbit |
| Ergostine plus caffeine plus mepithiathene, 2:200:1 | 538 | 600 | 299 |
| Ergostine plus caffeine plus mepithiathene, 2:100:1 | 458 | 659 | 237 |
| Caffeine | 465 | 540 | 240 |

The new composition is useful for treating headaches of vascular origin, inter alia migraine, migraine equivalents or vascular headaches. Contra-indications are pregnancy, peripheral blood circulation disorders, Angina pectoris and coronary sclerosis as well as hepatic and renal insufficiency; a daily repeated administration of the preparation (i.e. a permanent treatment) is not recommendable.

A suitable daily dose against an attack of migraine is 0.5 to 10 mg. of the vasotonic lysergic acid derivative of the peptide type, 50 to 1000 mg. of caffeine and 0.5 to 10 mg. of mepithiathene. The dose is preferably administered orally or rectally. For example, one to two capsules (composition A, C, or D, see Examples 1, 3 and 4) or one suppository (composition B, E or F, see Examples 2, 5 and 6) are administered upon appearance of the first symptoms of an attack; in case of an insufficient effect or no esffect the initial dose is repeated every 30 to 45 minutes. The dose for each attack and each day (24 hours) should generally not exceed 6 capsules or 3 suppositories.

A combination preparation of the invention, containing as active materials ergotamine, caffeine and mepithiathene (variants C, D, E and F, see Examples 3 to 6) was clinically tested on 376 patients with the above indications. The preparation proved to be generally excellently tolerated; the sometimes observed side effects were all of a harmless and temporary nature (sedation, numbness, slight nauea, dryness of the mouth and nose) and only made it necessary to ease the treatment in a few cases. The effect generally set in 10 to 70 minutes (average 30 minutes) after peroral or rectal administration and continued at least for about 4 to 7 hours. In most of the cases the attack was definitely stopped. In 304 cases the therapeutic effect was definitely ascertainable: the results were excellent in 21.5% of the patients (stopping of the attack) and good in 55% of the patients (temporary stopping of the attack), whereas the proportion of moderate results (decrease of the intensity of the headache) only amounted to 5% and that of the unsatisfactory results and failures only to 18.5%.

For another preferred form of the new combination preparation, containing as active materials ergostine, caffeine and mepithiathene (variants A and B, see Examples 1 and 2) the results of a clinical testing on 110 patients with the above indications were as follows: the composition was also well tolerated; nausea and occasional vomiting were only observed in about 5% of the cases, and a slight hypersedation in about 8% of the cases. The therapeutic results were considered excellent in 33% of the patients (stopping of the attack) and good in 37% of the patients (temporary stopping of the attack), whereas the proportion of moderate results (decrease of the intensity of the headache) only amounted to 11%, and that of the unsatisfactory results and failure to only 19%.

A clear, unexpected superiority of the new combination preparation may be seen on comparing these results with those obtained with a known combination preparation containing ergotamine and caffeine, in 2634 evaluated cases with the above indications under comparable conditions (the same choice of patients, the same mode of administration, the same criteria of evaluation):

| Treatment | Results | | |
|---|---|---|---|
| | Excellent and good, percent | Moderate, percent | Unsatisfactory or lacking, percent |
| Ergostine plus caffeine plus mepithiathene. | 70 | 11 | 19 |
| Ergostine plus caffeine plus mepithiathene. | 76.5 | 5 | 18.5 |
| Ergotamine plus caffeine | 60 | 21 | 19 |

From the above results of the toxicological and clinical testing it may be seen that the new composition is an excellently tolerated medicament having a rapid, lasting and strong effect. The composition is superior to similar preparations having similar effects and is therefore a valuable medicament.

What is claimed is:

1. A pharmaceutical composition suitable for use in the treatment of headaches of vascular origin incorporating as active constituents:

(a) a vasotonic lysergic acid selected from ergostine, ergotamine, dihydroergostine, dihydroergotamine, ergovaline, 5'-methylergoalanine or a pharmaceutically acceptable acid addition salt thereof;
   (b) caffeine; and
   (c) 9-(1-methyl - 4 - piperidylidene)thioxanthene or a pharmaceutically acceptable acid addition salt thereof; the proportion of constituents (a):(b):(c) being, by weight from about 1:5:0.05 to about 1:2000:20.

2. A pharmaceutical composition according to claim 1, in which the proportion of the constituent (a):(b):(c) is, by weight, from about 0.5:30:1 to about 3:300:1.

3. A pharmaceutical composition according to claim 1, in which the constituent (a) is ergostine hydrogen maleate or ergotamine tartrate.

4. A pharmaceutical composition according to claim 1, in unit dose form, and incorporating from about 0.5 mg. to about 3 mg. of constituent (a), from about 50 mg. to about 300 mg. of constituent (b), and from about 0.3 mg. to about 3 mg. of constituent (c).

5. A method of treating a patient for headaches of vascular origin, which comprises administering to the patient a therapeutically effective amount of the pharmaceutical composition of claim 1.

6. A method according to claim 5, in which the therapeutically effective amount of the pharmaceutical composition comprises a daily dose of from about 0.5 mg. to about 10 mg. of constituent (a), from about 50 mg. to about 1000 mg. of constituent (b), and from about 0.5 mg. to about 10 mg. of constituent (c).

References Cited
UNITED STATES PATENTS 3,160,562  12/1964  Cerletti et al. _____ 424—253

STANLEY J. FRIEDMAN, Primary Examiner

U.S. Cl. X.R.

424—261, 267